US010923147B2

(12) United States Patent
Tang et al.

(10) Patent No.: US 10,923,147 B2
(45) Date of Patent: Feb. 16, 2021

(54) MAGNETIC MEDIA DESIGN WITH MULTIPLE NON-MAGNETIC EXCHANGE CONTROL LAYERS

(71) Applicant: Western Digital Technologies, Inc., San Jose, CA (US)

(72) Inventors: Kai Tang, San Jose, CA (US); Arien Michael Ghaderi, Morgan Hill, CA (US); Tuqiang Li, San Jose, CA (US); Chi Ho Lo, Milpitas, CA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 356 days.

(21) Appl. No.: 15/959,120

(22) Filed: Apr. 20, 2018

(65) Prior Publication Data
US 2019/0325905 A1    Oct. 24, 2019

(51) Int. Cl.
*G11B 5/66* (2006.01)
*G11B 5/84* (2006.01)
*G11B 5/82* (2006.01)

(52) U.S. Cl.
CPC .................. *G11B 5/66* (2013.01); *G11B 5/82* (2013.01); *G11B 5/84* (2013.01)

(58) Field of Classification Search
CPC ................ G11B 5/66; G11B 5/82; G11B 5/84
See application file for complete search history.

(56) References Cited

U.S. PATENT DOCUMENTS

| 8,119,263 | B2 | 2/2012 | Nolan et al. |
| 9,129,638 | B1 | 9/2015 | Choe et al. |
| 9,142,240 | B2 | 9/2015 | Nolan et al. |
| 9,190,094 | B2 | 11/2015 | Hong et al. |
| 9,245,564 | B2 | 1/2016 | Arnoldussen et al. |
| 9,672,856 | B1 | 6/2017 | Tonooka et al. |
| 2004/0009372 | A1* | 1/2004 | Ataka .................. G11B 5/8404 428/832 |
| 2011/0003175 | A1 | 1/2011 | Valcu et al. |
| 2016/0267935 | A1 | 9/2016 | Ikeda |

OTHER PUBLICATIONS

Bai et al, "Effective Field Analysis of Segmented Media for Microwave Assisted Magnetic Recording"; IEEE Magnetics Letters, vol. 8; 2017; Digital Object Identifier 10.1109/LMAG.2017.2734047; https://www.researchgate.net/publication/318801902_Effective_Field_Analysis_of_Segmented_Media_for_Microwave_Assisted_Magnetic_Recording; 5 pages.

* cited by examiner

*Primary Examiner* — Holly Rickman
(74) *Attorney, Agent, or Firm* — Loza & Loza, LLP; Gabriel Fitch (57) ABSTRACT

Magnetic media including a magnetic recording layer structure of at least six magnetic recording sublayers and at least six non-magnetic exchange control sublayers in an alternating pattern are provided. The magnetic recording layer structure includes a gradient of platinum content across the magnetic recording sublayers such that a top magnetic recording sublayer has a lowest platinum content and a bottom magnetic recording sublayer has a highest platinum content. In one such case, the magnetic media includes a substrate and the magnetic recording layer structure on the substrate. In another case, a method of fabricating such magnetic media is provided.

30 Claims, 4 Drawing Sheets

MAGNETIC MEDIA DESIGN WITH MULTIPLE NON-MAGNETIC EXCHANGE CONTROL LAYERS

FIELD

Aspects of the present invention relate to magnetic media designs with multiple non-magnetic exchange control layers, and more specifically to magnetic media designs with six or more non-magnetic exchange control layers.

INTRODUCTION

Increasing the recording density of hard disk drives (HDDs) is becoming ever more challenging. Two key approaches to increasing the areal density capacity (ADC) of HDDs have included increasing the media signal-to-noise ratio (SNR), which leads to an increase in the linear density of the recording bits, and reducing the track width, which leads to an increase in the recording track density. Media structure designs that utilize an exchange-coupled composite have proven to be effective at increasing the ADC. In such media structures, magnetic recording sublayers and non-magnetic exchange control sublayers (ECLs) are deposited in an alternating fashion. The magnetic recording sublayers store the magnetic information, while the ECLs provide vertical decoupling between adjacent magnetic sublayers to reduce noise and improve media writability, allowing optimum balance between media SNR, writability and thermal stability. In historic and current HDD products, magnetic recording layer structures including up to five ECLs have been utilized.

SUMMARY

One aspect of the present disclosure provides a magnetic medium including a substrate and a magnetic recording layer structure on the substrate. The magnetic recording layer structure includes an alternating pattern of magnetic recording sublayers and non-magnetic exchange control sublayers formed of at least six magnetic recording sublayers and at least six non-magnetic exchange control sublayers. In some aspects, the magnetic recording layer structure includes a gradient of platinum content across the magnetic recording sublayers in which a bottom magnetic recording sublayer that is nearest to the substrate has a highest platinum content and a top magnetic recording sublayer that is furthest from the substrate has a lowest platinum content. In some examples, the lowest platinum content is between about twelve and eighteen atomic percent and the highest platinum content is between about nineteen and twenty-four atomic percent.

Another aspect of the present disclosure provides a method for fabricating a magnetic medium. The method includes providing a substrate, forming a soft underlayer on the substrate, forming a seed layer on the soft underlayer, and forming a magnetic recording layer structure on the seed layer. The magnetic recording layer structure includes an alternating pattern of magnetic recording sublayers and non-magnetic exchange control sublayers formed of at least six magnetic recording sublayers and at least six non-magnetic exchange control sublayers. In some aspects, the magnetic recording layer structure includes a gradient of platinum content across the magnetic recording sublayers in which a bottom magnetic recording sublayer that is nearest the substrate has a highest platinum content and a top magnetic recording sublayer that is furthest from the substrate has a lowest platinum content. In some examples, the lowest platinum content is between about twelve and eighteen atomic percent and the highest platinum content is between about nineteen and twenty-four atomic percent.

DETAILED DESCRIPTION

To further increase ADC, a sixth magnetic recording sublayer and a sixth ECL sublayer may be added to the magnetic recording layer structure. However, simply adding a sixth magnetic recording sublayer and a sixth ECL results in thickening of the total magnetic stack, and consequently, reduction of media SNR at both 1 T (maximum product linear density) and 2 T (half of the maximum product linear density), as compared to a five ECL magnetic recording layer structure. Reducing the total magnetic stack thickness may increase the SNR, but decrease the coercivity (Hc) and widen the magnetic core width (MCW), resulting in no ADC gain. Therefore, in some aspects, the magnetic recording layer structure includes a gradient of platinum content across the magnetic recording sublayers to produce a magnetic anisotropy, Ku, gradient across the magnetic recording layer structure.

Referring now to the drawings, embodiments of magnetic recording media including a magnetic recording layer structure including at least six magnetic recording sublayers and at least six non-magnetic exchange control sublayers, and methods for fabricating such media, are illustrated. One such magnetic medium includes a substrate, a soft underlayer on the substrate, a seed layer on the soft underlayer, optional intermediate layer(s), and the magnetic recording layer structure.

Figure 1:
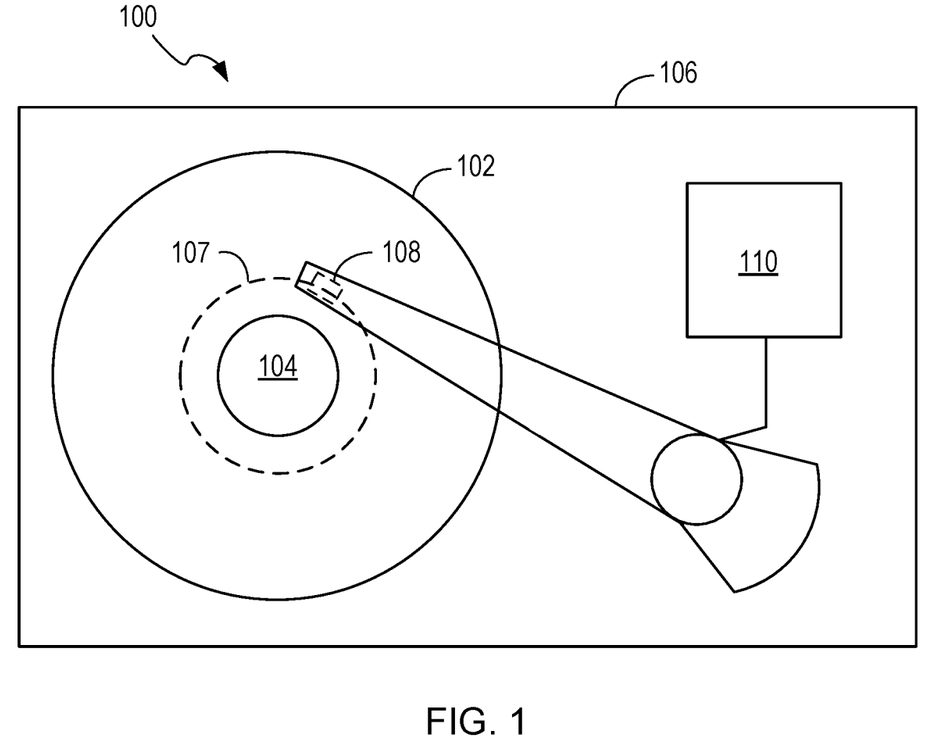
FIG. 1 is a top schematic view of a disk drive configured for magnetic recording and including a magnetic medium with a magnetic recording layer structure having multiple non-magnetic exchange control sublayers in accordance with one embodiment of the disclosure.

FIG. 1 is a top schematic view of a disk drive 100 configured for magnetic recording and including a magnetic medium 102 with a magnetic recording layer structure including at least six magnetic recording sublayers and at least six non-magnetic exchange control sublayers arranged in an alternating fashion in accordance with one embodiment of the disclosure. In some examples, the magnetic medium 102 may include a perpendicular magnetic recording (PMR) medium, shingle-written magnetic recording (SMR) medium, or a microwave assisted magnetic recording (MAMR) medium.

Disk drive 100 may include one or more disks/media 102 to store data. Disk/media 102 resides on a spindle assembly 104 that is mounted to drive housing 106. Data may be stored along tracks 107 in the magnetic recording layer of disk 102. The reading and writing of data is accomplished with the head/slider 108 that may have both read and write elements. The write element is used to alter the properties of the magnetic recording layer of disk 102 and thereby write information thereto. In one embodiment, head 108 may have magneto-resistive (MR), or giant magneto-resistive (GMR) elements. In another embodiment, head 108 may be another type of head, for example, an inductive read/write head or a Hall effect head.

In operation, a spindle motor (not shown) rotates the spindle assembly 104, and thereby rotates disk 102 to position head 108 at a particular location along a desired disk track 107. The position of head 108 relative to disk 102 may be controlled by position control circuitry 110.

Figure 2:
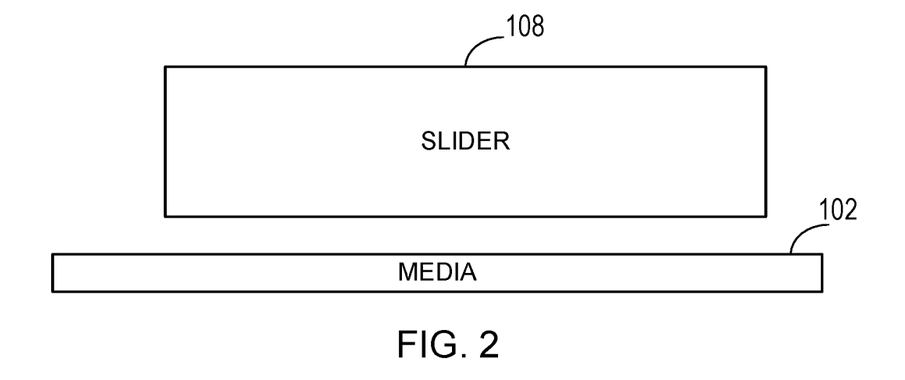
FIG. 2 is a side cross sectional schematic view of selected components of the magnetic recording system of FIG. 1 including the magnetic medium with the magnetic recording layer structure having multiple non-magnetic exchange control sublayers in accordance with one embodiment of the disclosure.

FIG. 2 is a side cross sectional schematic view of selected components of the magnetic recording system of FIG. 1 including the magnetic medium 102 with the magnetic recording layer structure in accordance with one embodiment of the disclosure. The head/slider 108 is positioned above the medium 102. The head/slider 108 includes a write element and a read element positioned along an air bearing surface (ABS) of the slider (e.g., bottom surface) for writing information to, and reading information from, respectively, the medium 102. FIGS. 1 and 2 illustrate a specific example of a magnetic recording system. In other examples, embodiments of the improved media with the magnetic recording layer structure disclosed herein can be used in other suitable magnetic systems.

Figure 3:
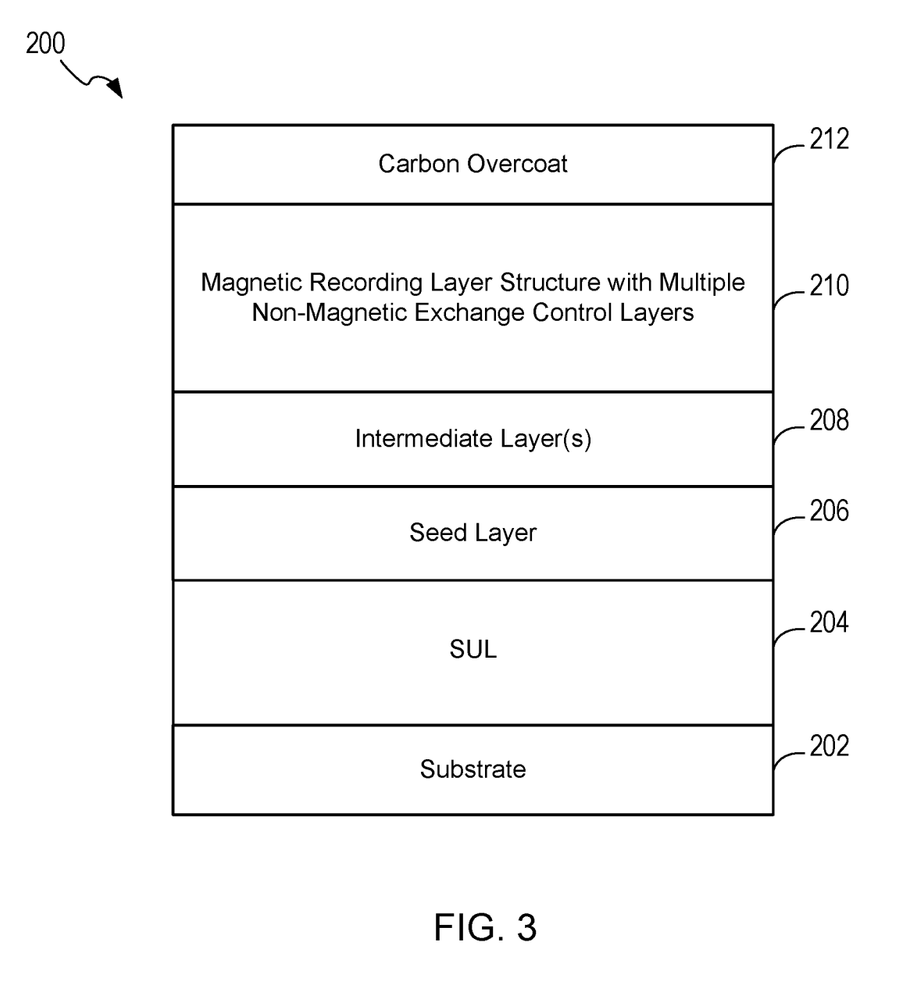
FIG. 3 is side cross sectional view of a magnetic medium having a magnetic recording layer structure with multiple non-magnetic exchange control sublayers in accordance with one embodiment of the disclosure.

FIG. 3 is side cross sectional view of a magnetic medium 200 having a magnetic recording layer structure 210 including six magnetic recording sublayers interleaved with six non-magnetic exchange control sublayers in accordance with one embodiment of the disclosure. In particular embodiments, the magnetic medium 200 can be used in conjunction with the disk drive 100 of FIGS. 1 and 2. In sequence from the bottom, the medium 200 includes a substrate 202, a soft magnetic underlayer 204, a seed layer 206, one or more optional intermediate layers 208, the magnetic recording layer structure 210, and an overcoat layer 212.

The substrate 202 can be made of one or more materials such as an Al alloy, NiP plated Al, glass, glass ceramic, and/or combinations thereof. In one embodiment, the substrate 202 is a glass substrate having a diameter of about 97 millimeters or less. In other embodiments, the diameter may vary.

The soft magnetic underlayer 204 can be made of one or more materials, such as cobalt, iron, molybdenum, tantalum, niobium, boron, chromium, or other soft magnetic material, or combinations thereof. In one aspect, the soft magnetic underlayer 204 may include two soft magnetic underlayers separated by an anti-ferromagnetic coupling (AFC) layer, such as Ru or other AFC material. The soft magnetic underlayer 204 may be configured to support magnetization of the magnetic recording layer structure 210 during data storage operations.

The seed layer 206 can be made of one or more materials, such as those containing elements of Ni, W, Fe, Cr, Al, combinations thereof, and/or other suitable materials known in the art. The one or more optional intermediate layers 208 can be made of one or more materials, such as those containing elements of Co, Cr, Ru, and/or other suitable materials known in the art. The overcoat layer 212 can be made of one or more materials, such as C and/or other suitable materials known in the art.

In one embodiment, the medium 200 may also include a lubricant layer on the overcoat 212. In such case, the lubricant layer can be made of one or more materials such as a polymer based lubricant and/or other suitable materials known in the art.

Figure 4:
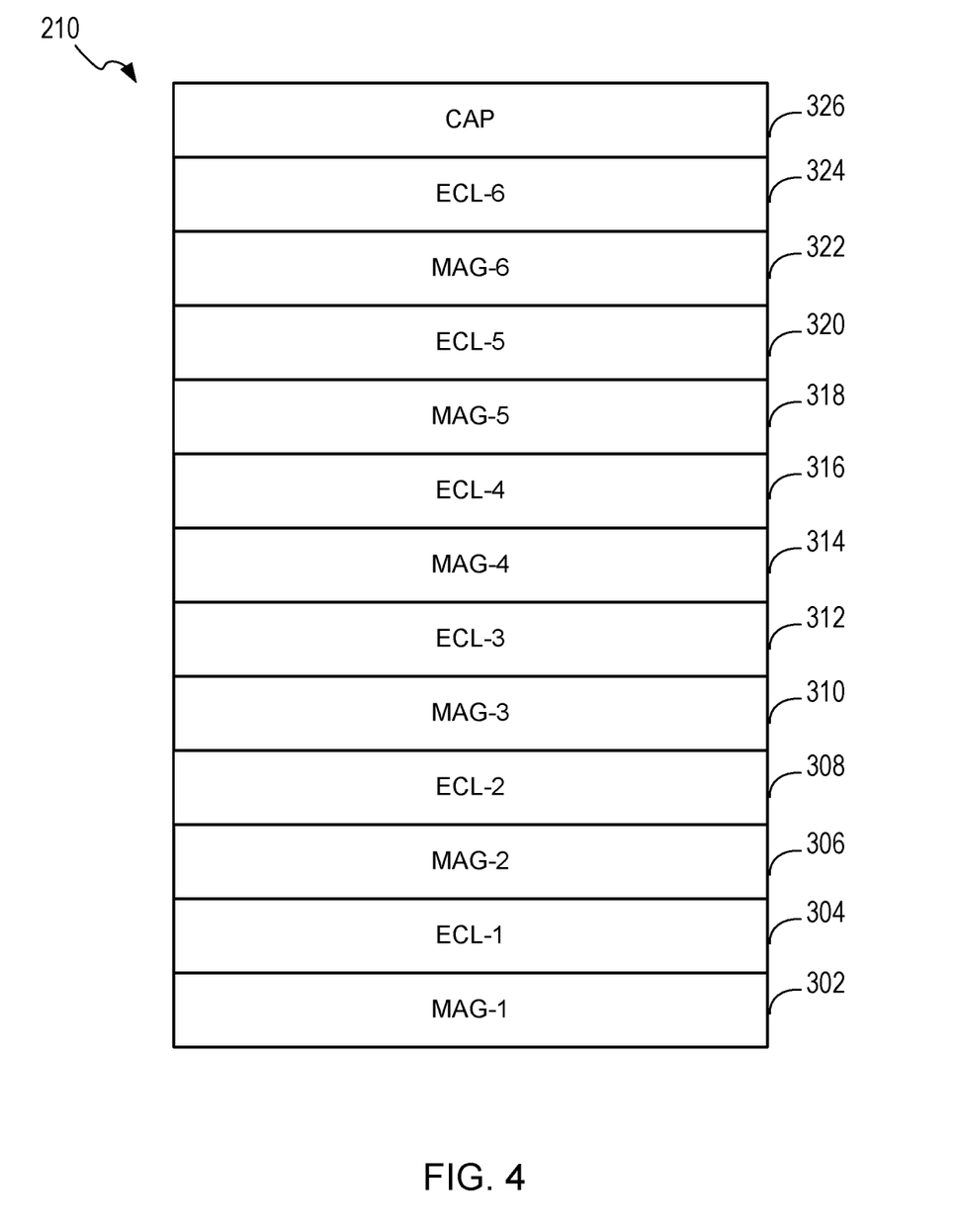
FIG. 4 is a side cross sectional view of a magnetic recording layer structure having six magnetic recording sublayers and six non-magnetic exchange control sublayers in accordance with one embodiment of the disclosure.

FIG. 4 is side cross sectional view of the magnetic recording layer structure 210 in accordance with one embodiment of the disclosure. The magnetic recording layer structure 210 includes six magnetic recording sublayers 302, 306, 310, 314, 318, and 322 (denoted MAG-1, MAG-2, MAG-3, MAG-4, MAG-5, and MAG-6) and six non-magnetic exchange control sublayers 304, 308, 312, 316, 320, and 324 (denoted ECL-1, ECL-2, ECL-3, ECL-4, ECL-5, and ECL-6) arranged in an alternating pattern. In the example shown in FIG. 4, MAG-1 is the bottom magnetic recording sublayer (e.g., the magnetic recording sublayer nearest the substrate, shown in FIG. 3), while MAG-6 is the top magnetic recording sublayer (e.g., the magnetic recording sublayer furthest from the substrate, shown in FIG. 3).

Each of the magnetic recording sublayers 302, 306, 310, 314, 318, and 322 can be made of one or more magnetic materials, such as CoPt and/or CoCrPt, or other magnetic materials suitable for storing information magnetically. In some examples, each of the magnetic recording sublayers 302, 306, 310, 314, 318, and 322 is made of a cobalt alloy including platinum. In addition, one or more of the magnetic recording sublayers 302, 306, 310, 314, 318, and 322 may further include one or more additional materials, such as those containing elements of Cr, B, Ru, and/or combinations thereof.

In one aspect, each of the magnetic recording sublayers 302, 306, 310, 314, 318, and 322 includes magnetic grains (e.g., made of a cobalt alloy including platinum, such as CoPt and/or CoCrPt) embedded within a mixture of one or more oxide segregants. Suitable oxide segregants may include, but are not limited to, $SiO_2$, $TiO_2$, $Cr_2O_3$, $B_2O_3$, CoO, $CO_3O_4$, and/or combinations thereof. In some examples, the top magnetic recording sublayer 322 (MAG-6) may include at least the oxide segregant of $TiO_2$.

Each of the non-magnetic exchange control sublayers 304, 308, 312, 316, 320, and 324 can be made of one or more materials, such as CoRu and/or CoRuCr with an oxide segregant, such as $TiO_2$, or other suitable non-magnetic material.

In one embodiment, the magnetic recording layer structure 210 may also include a capping layer 326. In such case, the capping layer can be made of one or more materials such as Co, Pt, Cr, B, combinations thereof, and/or other suitable materials known in the art.

To increase the ADC, while improving the media SNR, the magnetic recording layer structure 210 may include a gradient of platinum across the magnetic recording sublayers 302, 306, 310, 314, 318, and 322. In some examples, the bottom magnetic recording sublayer (MAG-1) 302 may include the highest platinum content from among the magnetic recording sublayers, while the top magnetic recording sublayer (MAG-6) 322 may include the lowest platinum content from among the magnetic recording sublayers. For example, MAG-6 may include a platinum content between about twelve and eighteen atomic percent, while MAG-1 may include a platinum content between about nineteen and twenty-four atomic percent. As used herein, the term "about" refers to a deviation of up to five percent.

In addition, each additional magnetic recording sublayer 306, 310, 314, and 318 between MAG-1 and MAG-6 may include a platinum content between MAG-1 and MAG-6 that is equal to or less than the platinum content of the next-lower adjacent magnetic recording sublayer. For example, MAG-5 may have a platinum content greater than MAG-6, but equal to or less than the platinum content of MAG-4, MAG-4 may have a platinum content equal to or less than the platinum content of MAG-3, and so on. In one aspect, MAG-2 may have a platinum content less than MAG-1, but greater than MAG-3. In another aspect, MAG-2 and MAG-3 may each have an equal platinum content that is less than MAG-1, but greater than MAG-4.

Platinum content is a key factor in determining the magnetic anisotropy, Ku, of the alloy. A higher Pt content leads to higher Ku. Thus, by utilizing a gradient of platinum content across the magnetic recording sublayers 302, 306, 310, 314, 318, and 322, a Ku gradient may also be achieved, with each of the magnetic recording sublayers having a Ku equal to or less than the next-lower adjacent magnetic recording sublayer.

In addition, by utilizing a platinum content of between about 12%-18% in the top magnetic recording sublayer 322 (MAG-6) and a platinum content of between about 19%-24% in the bottom magnetic recording sublayer 302 (MAG-1), the Ku of the MAG-1 and MAG-6 alloys may be optimized, thus enabling the respective thicknesses of the intermediate magnetic recording sublayers (e.g., MAG-2 through MAG-5) to be reduced (e.g., by approximately 70%) in comparison to the top and bottom magnetic recording sublayers (e.g., MAG-1 and MAG-6). In one example, the thickness of the MAG-1 and MAG-6 sublayers may be between about twenty and fifty angstroms, whereas the thickness of the intermediate magnetic recording sublayers (e.g., MAG-2 through MAG-5) may be between about two and twenty angstroms.

As a result of the reduction in total thickness of MAG-1 through MAG-6, the resolution of the recording media may be improved. The higher Ku of the MAG-6 sublayer may also allow the use of thicker ECL sublayers, which reduces vertical magnetic coupling, thus improving SNR. The resulting magnetic recording layer structure 210 of the six ECL design shown in FIG. 4 may give rise to more than 0.5 dB $SNR_{2T}$ and $SNR_{1T}$ gain over five ECL designs, which translates to an increase of 1.92 and 1.77% figure of merit (FOM) (correlated to areal density capacity) respectively, at MD (mid radius) an OD (outer radius).

Figure 5:
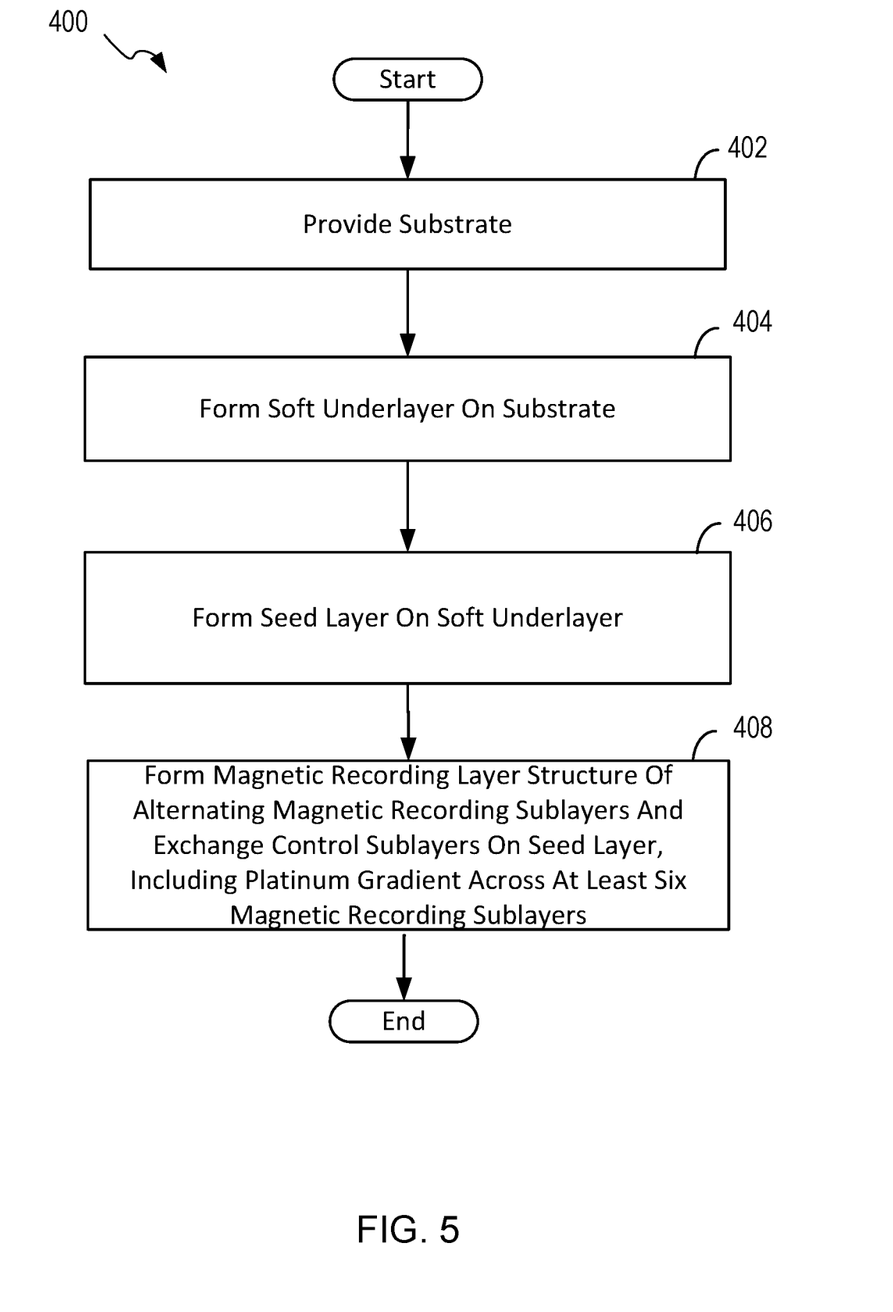
FIG. 5 is a flowchart of a process for fabricating a magnetic medium including a magnetic recording layer structure having at least six magnetic recording sublayers and at least six non-magnetic exchange control sublayers in accordance with one embodiment of the disclosure.

FIG. 5 is a flowchart of a process 400 for fabricating a magnetic medium including a magnetic recording layer structure having at least six magnetic recording sublayers and at least six non-magnetic exchange control sublayers in accordance with one embodiment of the disclosure. In particular embodiments, the process 400 can be used to fabricate the magnetic medium described above including medium 200 and/or medium 102. At block 402, the process provides a substrate. At block 404, a soft underlayer (e.g., SUL 204 in FIG. 3) is formed on the substrate. At block 406, a seed layer (e.g., seed layer 206 in FIG. 3) is formed on the substrate. In addition, one or more optional intermediate layers (e.g., intermediate layer(s) 208 in FIG. 3) may also be formed on the seed layer.

At block 408, a magnetic recording layer structure of alternating magnetic recording sublayers and non-magnetic exchange control sublayers is formed on the seed layer. In an aspect, at least six magnetic recording sublayers and at least six exchange control sublayers are included in the magnetic recording layer structure. For example, a first or bottom magnetic recording sublayer may be formed on the seed layer, a first exchange control sublayer may be formed on the first magnetic recording sublayer, a second magnetic recording sublayer may be formed on the first exchange control sublayer, a second exchange control sublayer may be formed on the second magnetic recording sublayer, a third magnetic recording sublayer may be formed on the second exchange control sublayer, a third exchange control sublayer may be formed on the third magnetic recording sublayer, a fourth magnetic recording sublayer may be formed on the third exchange control sublayer, a fourth exchange control sublayer may be formed on the fourth magnetic recording sublayer, a fifth magnetic recording sublayer may be formed on the fourth exchange control sublayer, a fifth exchange control sublayer may be formed on the fifth magnetic recording sublayer, a sixth magnetic recording sublayer may be formed on the fifth exchange control sublayer, and a sixth exchange control sublayer may be formed on the sixth magnetic recording sublayer. In some examples, a capping layer (e.g., non-oxide containing recording layer) may be formed on the sixth exchange control sublayer.

Each of the magnetic recording sublayers includes oxide-containing magnetic materials (e.g., made of a cobalt alloy including platinum, such as CoPt and/or CoCrPt together with one or more oxide segregants, including, but not limited to, $SiO_2$, $TiO_2$, $Cr_2O_3$, $B_2O_3$, $CoO$, $Co_3O_4$, and/or combinations thereof). Each of the non-magnetic exchange control sublayers can be made of one or more materials, such as CoRu and/or CoRuCr with an oxide segregant, such as $TiO_2$, or other suitable non-magnetic material.

The magnetic recording layer structure is further formed such that a gradient of platinum is present across the magnetic recording sublayers. In some examples, the bottom magnetic recording sublayer may include the highest platinum content from among the magnetic recording sublayers, while the top magnetic recording sublayer may include the lowest platinum content from among the magnetic recording sublayers. For example, the top magnetic recording sublayer may include a platinum content between about twelve and eighteen atomic percent, while the bottom magnetic recording sublayer may include a platinum content between about nineteen and twenty-four atomic percent. Each additional magnetic recording sublayer between the top and bottom magnetic recording sublayers may include a platinum content between the highest and lowest platinum contents that is equal to or less than the platinum content of the next-lower adjacent magnetic recording sublayer.

In addition, the thickness of the top and bottom magnetic recording sublayers may be larger than the thickness of the intermediate magnetic recording sublayers. For example, the thickness of the top and bottom magnetic recording sublayers may be between twenty and fifty angstroms, while the thickness of the additional intermediate magnetic recording sublayers may be between two and twenty angstroms.

In one aspect, the soft underlayer and seed layer are deposited at an ambient room temperature (e.g., without applying heat prior to or during deposition). In one aspect, the magnetic recording layer structure may be deposited at a temperature of about 150 degrees Celsius, or a temperature in the range from 50 to 340 degrees Celsius.

In one embodiment, the process can perform the sequence of actions in a different order. In another embodiment, the process can skip one or more of the actions. In other embodiments, one or more of the actions are performed simultaneously. In some embodiments, additional actions can be performed. For example, in one aspect, the process may include any additional actions needed to fabricate the magnetic layer structure of the media 200 of FIG. 3.

In several embodiments, the forming or deposition of such layers can be performed using a variety of deposition sub-processes, including, but not limited to physical vapor deposition (PVD), direct current (DC) sputter deposition, ion beam deposition, radio frequency sputter deposition, or chemical vapor deposition (CVD), including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner Tasks or events may be added to or removed from the disclosed example embodiments. The example systems and components described herein may be configured differently than described. For example, elements may be added to, removed from, or rearranged compared to the disclosed example embodiments.

What is claimed is:

1. A magnetic medium, comprising:
   a substrate; and
   a magnetic recording layer structure on the substrate, the magnetic recording layer structure comprising an alternating pattern of magnetic recording sublayers and non-magnetic exchange control sublayers;
   wherein the magnetic recording layer structure comprises at least six of the magnetic recording sublayers and at least six of the non-magnetic exchange control sublayers;
   wherein the at least six of the magnetic recording sublayers comprise:
      a bottom magnetic recording sublayer that is nearest the substrate;
      a top magnetic recording sublayer of the magnetic recording sublayers that is furthest from the substrate; and
      at least four middle magnetic recording sublayers positioned between the top and bottom recording sublayers and comprising a first middle magnetic recording sublayer that is furthest among the middle magnetic recording sublayers from the substrate;
   wherein the magnetic recording layer structure further comprises a gradient of platinum content across the magnetic recording sublayers such that the bottom magnetic recording sublayer comprises a highest platinum content among the magnetic recording sublayers and the top magnetic recording sublayer comprises a lowest platinum content among the magnetic recording sublayers; and
   wherein the first middle magnetic recording sublayer and the top magnetic recording sublayer comprise equal platinum content.

2. The magnetic medium of claim 1, wherein the lowest platinum content is between about twelve and eighteen atomic percent and the highest platinum content is between about nineteen and twenty-four atomic percent.

3. The magnetic medium of claim 1, wherein each magnetic recording sublayer between the first middle magnetic recording sublayer and the bottom magnetic recording sublayer comprises a respective platinum content equal to or less than a respective adjacent platinum content of a respective adjacent magnetic recording sublayer closer to the substrate than the each magnetic recording sublayer.

4. The magnetic medium of claim 3, wherein each of the magnetic recording sublayers between the first middle magnetic recording sublayer and the bottom magnetic recording sublayer comprises a Ku equal to or less than the respective adjacent magnetic recording layer below the each magnetic recording sublayer.

5. The magnetic medium of claim 1, wherein the magnetic recording layer structure comprises:
   a first magnetic recording sublayer on the substrate, wherein the first magnetic recording sublayer comprises the bottom magnetic recording sublayer;
   a first non-magnetic exchange control sublayer on the first magnetic recording sublayer;
   a second magnetic recording sublayer on the first non-magnetic exchange control sublayer;
   a second non-magnetic exchange control sublayer on the second magnetic recording sublayer;
   a third magnetic recording sublayer on the second non-magnetic exchange control sublayer;
   a third non-magnetic exchange control sublayer on the third magnetic recording sublayer;
   a fourth magnetic recording sublayer on the third non-magnetic exchange control sublayer;
   a fourth non-magnetic exchange control sublayer on the fourth magnetic recording sublayer;
   a fifth magnetic recording sublayer on the fourth non-magnetic exchange control sublayer;
   a fifth non-magnetic exchange control sublayer on the fifth magnetic recording sublayer;
   a sixth magnetic recording sublayer on the fifth non-magnetic exchange control sublayer, wherein the sixth magnetic recording sublayer comprises the top magnetic recording sublayer; and
   a sixth non-magnetic exchange control sublayer on the sixth magnetic recording sublayer.

6. The magnetic medium of claim 5, wherein the magnetic recording layer structure further comprises:
   a capping layer on the sixth non-magnetic exchange control sublayer.

7. The magnetic medium of claim 5, wherein the second magnetic recording sublayer comprises a second platinum content less than the highest platinum content of the bottom magnetic recording sublayer and greater than a fifth platinum content of the fifth magnetic recording sublayer.

8. The magnetic medium of claim 7, wherein the third magnetic recording sublayer comprises a third platinum content equal to the second platinum content of the second magnetic recording sublayer.

9. The magnetic medium of claim 1, wherein each of the magnetic recording sublayers further comprises a cobalt alloy comprising platinum and at least one oxide segregant.

10. The magnetic medium of claim 9, wherein each of the magnetic recording sublayers further comprises one or more materials selected from the group consisting of Cr, B, Ru, and combinations thereof.

11. The magnetic medium of claim 9, wherein the at least one oxide segregant comprises one or more materials selected from the group consisting of CoO, $Cr_2O_3$, $TiO_2$, $Co_3O_4$, $B_2O_3$, $SiO_2$, and combinations thereof.

12. The magnetic medium of claim 11, wherein the top magnetic recording sublayer comprises $TiO_2$.

13. The magnetic medium of claim 1, wherein the top magnetic recording sublayer and the bottom magnetic recording sublayer each comprise a first thickness and the at least four middle magnetic recording sublayers each comprise a second thickness less than the first thickness.

14. The magnetic medium of claim 13, wherein the first thickness is between twenty and fifty angstroms and the second thickness is between two and twenty angstroms.

15. The magnetic medium of claim 1, wherein the magnetic medium comprises a perpendicular magnetic recording (PMR) medium, shingle-written magnetic recording (SMR) medium, or a microwave assisted magnetic recording (MAMR) medium.

16. A method for fabricating magnetic media, comprising:
providing a substrate;
forming a soft underlayer on the substrate;
forming a seed layer on the soft underlayer; and
forming a magnetic recording layer structure on the seed layer, the magnetic recording layer structure comprising an alternating pattern of magnetic recording sublayers and non-magnetic exchange control sublayers;
wherein the magnetic recording layer structure comprises at least six of the magnetic recording sublayers and at least six of the non-magnetic exchange control sublayers;
wherein the at least six of the magnetic recording sublayers comprise:
a bottom magnetic recording sublayer that is nearest the substrate;
a top magnetic recording sublayer of the magnetic recording sublayers that is furthest from the substrate; and
at least four middle magnetic recording sublayers positioned between the top and bottom recording sublayers and comprising a first middle magnetic recording sublayer that is furthest among the middle magnetic recording sublayers from the substrate;
wherein the magnetic recording layer structure further comprises a gradient of platinum content across the magnetic recording sublayers such that the bottom magnetic recording sublayer comprises a highest platinum content among the magnetic recording sublayers and the top magnetic recording sublayer comprises a lowest platinum content among the magnetic recording sublayers; and
wherein the first middle magnetic recording sublayer and the top magnetic recording sublayer comprise equal platinum content.

17. The method of claim 16, wherein:
the lowest platinum content is between about twelve and eighteen atomic percent and the highest platinum content is between about nineteen and twenty-four atomic percent; and
each magnetic recording sublayer between the first middle magnetic recording sublayer and the bottom magnetic recording sublayer comprises a respective platinum content equal to or less than a respective adjacent platinum content of a respective adjacent magnetic recording sublayer closer to the substrate than the each magnetic recording sublayer.

18. The method of claim 16, wherein the forming the magnetic recording layer structure comprises:
forming a first magnetic recording sublayer on the substrate, wherein the first magnetic recording sublayer comprises the bottom magnetic recording sublayer;
forming a first non-magnetic exchange control sublayer on the first magnetic recording sublayer;
forming a second magnetic recording sublayer on the first non-magnetic exchange control sublayer;
forming a second non-magnetic exchange control sublayer on the second magnetic recording sublayer;
forming a third magnetic recording sublayer on the second non-magnetic exchange control sublayer;
forming a third non-magnetic exchange control sublayer on the third magnetic recording sublayer;
forming a fourth magnetic recording sublayer on the third non-magnetic exchange control sublayer;
forming a fourth non-magnetic exchange control sublayer on the fourth magnetic recording sublayer;
forming a fifth magnetic recording sublayer on the fourth non-magnetic exchange control sublayer;
forming a fifth non-magnetic exchange control sublayer on the fifth magnetic recording sublayer;
forming a sixth magnetic recording sublayer on the fifth non-magnetic exchange control sublayer, wherein the sixth magnetic recording sublayer comprises the top magnetic recording sublayer; and
forming a sixth non-magnetic exchange control sublayer on the sixth magnetic recording sublayer.

19. The method of claim 18, wherein the forming the magnetic recording layer structure further comprises:
forming a capping layer on the sixth non-magnetic exchange control sublayer.

20. The method of claim 18, wherein the second magnetic recording sublayer comprises a second platinum content less than the highest platinum content of the bottom magnetic recording sublayer and greater than a fifth platinum content of the fifth magnetic recording sublayer.

21. The method of claim 20, wherein the third magnetic recording sublayer comprises a third platinum content equal to the second platinum content of the second magnetic recording sublayer.

22. The method of claim 16, wherein each of the magnetic recording sublayers further comprises a cobalt alloy comprising platinum and at least one oxide segregant.

23. The method of claim 22, wherein each of the magnetic recording sublayers further comprises one or more materials selected from the group consisting of Cr, B, Ru, and combinations thereof.

24. The method of claim 22, wherein the at least one oxide segregant comprises one or more materials selected from the group consisting of CoO, $Cr_2O_3$, $TiO_2$, $Co_3O_4$, $B_2O_3$, $SiO_2$, and combinations thereof.

25. The method of claim 24, wherein the top magnetic recording sublayer comprises $TiO_2$.

26. The method of claim 16, wherein:
the top magnetic recording sublayer and the bottom magnetic recording sublayer each comprise a first thickness and the at least four middle magnetic recording sublayers each comprise a second thickness less than the first thickness; and
the first thickness is between twenty and fifty angstroms and the second thickness is between two and twenty angstroms.

27. The method of claim 16, wherein forming the magnetic recording layer structure on the seed layer further comprises:
depositing the magnetic recording layer structure on the seed layer at a temperature in a range from 50 degrees Celsius to 340 degrees Celsius.

28. The method of claim 16, wherein forming the magnetic recording layer structure on the seed layer further comprises:
depositing the magnetic recording layer structure utilizing direct current (DC) sputtering.

29. The method of claim 16, wherein:
the top magnetic recording sublayer and the bottom magnetic recording sublayer each comprise a first thickness and the at least four middle magnetic recording sublayers each comprise a second thickness less than the first thickness; and
the second thickness is about 70 percent of the first thickness.

30. The magnetic medium of claim 1, wherein:
the top magnetic recording sublayer and the bottom magnetic recording sublayer each comprise a first thickness and the at least four middle magnetic recording sublayers each comprise a second thickness less than the first thickness; and
wherein the second thickness is about 70 percent of the first thickness.

\* \* \* \* \*

UNITED STATES PATENT AND TRADEMARK OFFICE
CERTIFICATE OF CORRECTION

PATENT NO. : 10,923,147 B2  
APPLICATION NO. : 15/959120  
DATED : February 16, 2021  
INVENTOR(S) : Kai Tang et al.

It is certified that error appears in the above-identified patent and that said Letters Patent is hereby corrected as shown below:

In the Specification (Column 5, Lines 58-63) reads:
At block 404, a soft underlayer (e.g., SUL 204 in FIG. 3) is formed on the substrate. At block 406, a seed layer (e.g., seed layer 206 in FIG. 3) is formed on the substrate. In addition, one or more optional intermediate layers (e.g., intermediate layer(s) 208 in FIG. 3) may also be formed on the seed layer.

Should read:
At block 404, a soft underlayer (e.g., SUL 204 in FIG. 3) is formed on the substrate. At block 406, a seed layer (e.g., seed layer 206 in FIG. 3) is formed on the SUL. In addition, one or more optional intermediate layers (e.g., intermediate layer(s) 208 in FIG. 3) may also be formed on the seed layer.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*